United States Patent
Schneider et al.

(10) Patent No.: US 7,685,271 B1
(45) Date of Patent: Mar. 23, 2010

(54) DISTRIBUTED PLATFORM FOR TESTING FILTERING RULES

(75) Inventors: Kenneth Schneider, San Francisco, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 821 days.

(21) Appl. No.: 11/278,104

(22) Filed: Mar. 30, 2006

(51) Int. Cl.
*G06F 7/04* (2006.01)
*G06F 9/00* (2006.01)
*G06F 9/44* (2006.01)
*G06F 11/00* (2006.01)
*G06F 12/14* (2006.01)
*G06F 12/16* (2006.01)
*G06F 15/16* (2006.01)
*G06F 15/173* (2006.01)
*G06F 17/00* (2006.01)
*G06F 17/30* (2006.01)
*G08B 23/00* (2006.01)
*H04L 29/06* (2006.01)

(52) U.S. Cl. ............ 709/224; 709/204; 709/209; 709/225; 717/120; 717/124; 726/4; 726/11; 726/13; 726/24; 726/25

(58) Field of Classification Search ........... 709/224, 709/204, 209, 225; 717/120, 124; 726/4, 726/11, 13, 24, 25
See application file for complete search history.

(56) References Cited

U.S. PATENT DOCUMENTS

| | | | | |
|---|---|---|---|---|
| 5,884,033 A * | 3/1999 | Duvall et al. | ................ | 709/206 |
| 6,009,475 A * | 12/1999 | Shrader | ...................... | 709/249 |
| 6,266,700 B1 * | 7/2001 | Baker et al. | ................. | 709/230 |
| 6,484,171 B1 * | 11/2002 | Corl et al. | ...................... | 707/7 |
| 6,493,868 B1 * | 12/2002 | DaSilva et al. | .............. | 717/105 |
| 6,529,897 B1 * | 3/2003 | Corl et al. | ...................... | 707/2 |
| 6,539,394 B1 * | 3/2003 | Calvignac et al. | ........... | 707/102 |
| 6,654,787 B1 * | 11/2003 | Aronson et al. | ............. | 709/206 |
| 6,718,521 B1 * | 4/2004 | Bentlage et al. | ................ | 716/4 |
| 6,807,576 B1 * | 10/2004 | Jeffries et al. | .............. | 709/225 |
| 6,947,983 B2 * | 9/2005 | Corl et al. | ................... | 709/224 |
| 6,973,491 B1 * | 12/2005 | Staveley et al. | ............. | 709/224 |
| 6,981,217 B1 * | 12/2005 | Knauft et al. | ............... | 715/210 |
| 7,133,400 B1 * | 11/2006 | Henderson et al. | ......... | 370/389 |
| 7,143,439 B2 * | 11/2006 | Cooper et al. | ................. | 726/11 |
| 7,369,554 B1 * | 5/2008 | Modelski et al. | ............ | 370/392 |
| 7,406,534 B2 * | 7/2008 | Syvanne et al. | ............. | 709/238 |
| 7,409,707 B2 * | 8/2008 | Swander et al. | ............... | 726/13 |
| 7,451,216 B2 * | 11/2008 | McKinley et al. | ........... | 709/225 |
| 7,478,426 B2 * | 1/2009 | Corl et al. | ..................... | 726/13 |

(Continued)

*Primary Examiner*—Tonia L Dollinger
*Assistant Examiner*—Daniel C Murray
(74) *Attorney, Agent, or Firm*—Fenwick & West LLP

(57) ABSTRACT

A distributed testing platform tests network traffic filtering rules. A control point receives a network traffic filtering rule and test parameters describing how to test the rule. The control point distributes the rule and parameters to a plurality of testing nodes. The testing nodes are located on a network at locations where they receive a variety of different network traffic. The testing nodes test the rule against traffic received by the nodes according to the test parameters. The traffic can include real-time traffic and corpora of traffic designed to test different types of rules. The testing nodes return test results describing the testing to the control point. The control point analyzes the test results to determine the accuracy and performance of the rule.

20 Claims, 6 Drawing Sheets

U.S. PATENT DOCUMENTS

| | | | |
|---|---|---|---|
| 7,493,333 B2 * | 2/2009 | Hill et al. | 707/102 |
| 7,505,989 B2 * | 3/2009 | Gardner et al. | 707/102 |
| 2002/0116463 A1 * | 8/2002 | Hart | 709/206 |
| 2002/0198981 A1 * | 12/2002 | Corl et al. | 709/224 |
| 2004/0167964 A1 * | 8/2004 | Rounthwaite et al. | 709/206 |
| 2004/0177110 A1 * | 9/2004 | Rounthwaite et al. | 709/202 |
| 2005/0015454 A1 * | 1/2005 | Goodman et al. | 709/207 |
| 2005/0120118 A1 * | 6/2005 | Thibadeau | 709/228 |
| 2006/0015561 A1 * | 1/2006 | Murphy et al. | 709/206 |
| 2006/0020600 A1 * | 1/2006 | Corl et al. | 707/10 |
| 2008/0052360 A1 * | 2/2008 | Jhawar | 709/206 |
| 2008/0215518 A1 * | 9/2008 | Matsuda | 706/47 |

* cited by examiner

DISTRIBUTED PLATFORM FOR TESTING FILTERING RULES

BACKGROUND OF THE INVENTION

1. Field of the Invention

This invention pertains in general to computer network security and in particular for testing filtering rules for firewalls and other network security devices.

2. Description of the Related Art

Enterprises, such as companies, government offices, and educational institutions, often filter network traffic for security reasons. Incoming network traffic from the Internet or other external networks is filtered to block email spam, viruses, intrusion attempts, etc. (collectively referred to as "malicious traffic"). Outgoing network traffic is often also filtered for malicious traffic. The filtering is performed by a firewall or other traffic filtering device.

The filtering device blocks traffic according to a set of rules. The rules describe types of traffic that can be encountered by the filtering device and specify whether the traffic is permitted and/or blocked. For example, a simple firewall rule can specify a network port that is closed, thereby blocking all traffic that attempts to use that port. A more complex rule can describe a sequence of values that represent a computer virus or other malicious software, and cause the filtering device to block the traffic that contains the sequence. More sophisticated rules can use heuristics or other techniques to analyze the contents of email message to characterize the messages as legitimate or spam.

The rules often execute autonomously on large volumes of network traffic. Therefore, there is a desire to make the rules as accurate as possible in order to minimize overhead and disruptions. "Accurate" in this context generally means to minimize false positive detections of malicious traffic (i.e., blocking of legitimate traffic), and also minimizing false negative detections (i.e., allowing malicious traffic to pass through the filter). One way to ensure the accuracy of a rule is to test it against a wide variety of real-world traffic. The more traffic a rule is tested against, the more confidence one can have that the rule is accurate.

Enterprises in the business of designing and providing filtering rules, such as security software vendors and the like, may have a hosted infrastructure—or may attempt to work with internet service providers (ISPs)—to receive large samples of real-world network traffic. The enterprises would then test the rules against the real-world traffic before releasing the rules for general use. Even the traffic from an ISP, however, might not be representative of the sort of traffic the rules will encounter when in wide release, meaning that many rules could be improved if tested against a wider variety of traffic. Additionally, smaller enterprises often lack the wherewithal to work with ISPs and test against large volumes of traffic. Thus, a person designing rules for a small enterprise might be forced to test the rules on only that enterprise's traffic, resulting in less confidence that the rules are accurate.

Furthermore, the rules sometimes must be designed and tested very quickly. For example, the security software vendor may need to design and test filtering rules designed to stop a fast-spreading virus before the infection gets out-of-hand. Due to the urgent need to distribute the filtering rules, the software vendor might not be able to test the rules against as much network traffic as it would prefer.

Therefore, there is a need in the art for a way to expand opportunities for testing filtering rules against network traffic.

BRIEF SUMMARY OF THE INVENTION

The above need is met by a distributed testing platform that allows rules to be quickly and efficiently tested against a wide variety of network traffic. A control point receives a network traffic filtering rule and test parameters describing how to test the rule from an end-user or another source. The control point distributes the rule and parameters to a plurality of testing nodes. The testing nodes are located on a network at locations where they receive a variety of different network traffic. The testing nodes test the rule against traffic received by the nodes according to the test parameters. The traffic can include real-time traffic and corpora of traffic designed to test different types of rules. The testing nodes return test results describing the testing to the control point. The control point analyzes the test results to determine the accuracy and performance of the rule. An end-user can use this accuracy and performance information to fine-tune the rule's performance.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
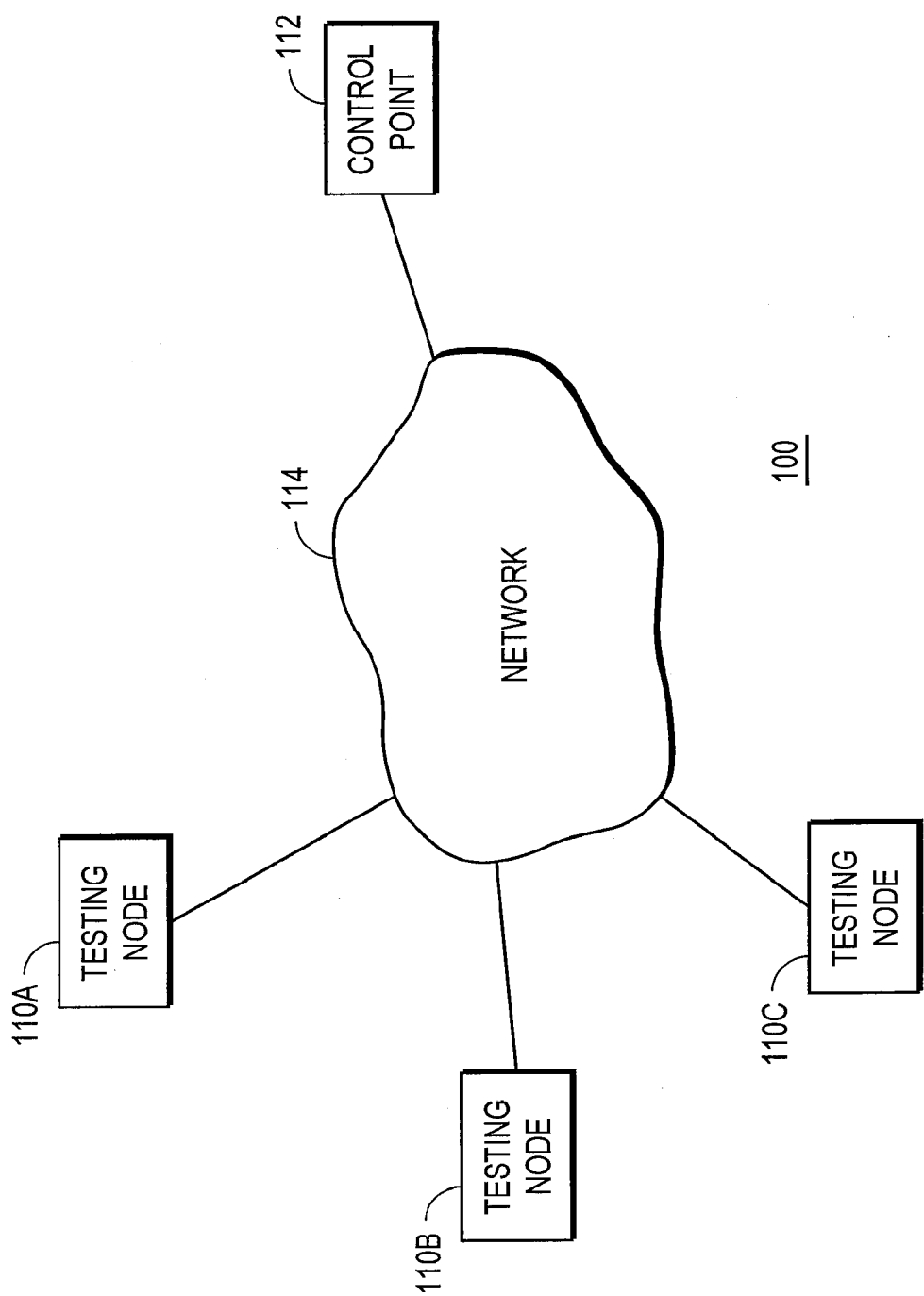
FIG. 1 is a high-level block diagram of a distributed testing platform according to one embodiment of the present invention.

FIG. 1 is a high-level block diagram of a distributed testing platform 100 according to one embodiment of the present invention. FIG. 1 illustrates three testing nodes 110A, 110B, 110C and a control point 112 connected by a network 114. In one embodiment, the testing nodes 110 are at different locations on the network 114 and receive different network traffic. The control point 112 provides filtering rules and test parameters to the testing nodes 110. The testing nodes 110 test the rules on the traffic received by the nodes, and report the test results to the control point 112. The platform 100 thus allows distributed testing of filtering rules on a wide variety of network traffic. In one embodiment, the control point 112 allows multiple end-users to access the testing platform 100, thereby allowing people from both large and small enterprises to test rules.

FIG. 1 and the other figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110A," "110B," and/or "110C" in the figures).

A testing node 110 is a hardware and/or software device that tests filtering rules on network traffic. In one embodiment, the testing node 110 receives the rules to test and test parameters from the control point 112 via the network 114. The testing node 110 tests the rules on network traffic according to the parameters and reports the results of the tests to the control point 112. Although FIG. 1 illustrates only three testing nodes 110, embodiments of the distributed testing platform 100 can have many such nodes.

In some embodiments, the testing nodes 110 are at locations on the network 114 where they receive large amounts of real-time network traffic, such as at peering points between networks. In addition, the testing nodes 110 are at disparate locations so that different nodes receive different network traffic. For example, each testing node 110 can be operated by a different enterprise, and can be located at the connection between the enterprise's internal network and the Internet, so that the testing node receives all network traffic between the enterprise and other destinations on the Internet. The network traffic can include, for example, emails, web browsing traffic, instant messaging (IM) traffic, and/or other types of data flows transported on the Internet and/or network 114 being tested.

In other embodiments, some testing nodes 110 receive little or no real-time traffic. Instead, the traffic can be buffered and applied to the testing node 110 at a later date. For example, the network traffic can comprise a set of emails that were received by a testing node over a given time period. Similarly, the network traffic provided to the testing node 110 can be a discrete corpus, such as a body of known legitimate emails designed to test spam filtering rules.

In one embodiment, the control point 112 receives rules and test parameters from end-users of the distributed testing platform 100, provides the rules and parameters to the testing nodes 110, and receives the results of the tests from the testing nodes. Depending upon the embodiment, the end-user can be a person associated with the control point 112, a person associated with an enterprise having a testing node 110, and/or a third party. Thus, the end-user can be associated with a rule content provider such as a network security firm that is developing and testing filtering rules for distribution to other parties. Likewise, the end-user can be associated with an enterprise that is developing and testing filtering rules that will be used on only the enterprise's local network. In some embodiments, the control point 112 enables simultaneous testing of different rule sets.

The control point 112 also provides functionality for analyzing the results of the tests and for controlling the operation of the individual testing nodes. In some embodiments, the control point 112 can include a testing node 110 or vice versa. Likewise, in some embodiments, the functionality of the control point 112 is distributed among the testing nodes 110 and thus the platform 100 may lack a distinct control point.

The network 114 represents the communication pathways between the testing nodes 110 and control point 112. In one embodiment, the network 114 is the Internet. The network 114 can also utilize dedicated or private communications links that are not necessarily part of the Internet. In one embodiment, the network 114 carries traffic using standard communications technologies and/or protocols. Thus, the network 114 can include links using technologies such as 802.11, integrated services digital network (ISDN), digital subscriber line (DSL), asynchronous transfer mode (ATM), etc. Similarly, the networking protocols used by traffic on the network 114 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
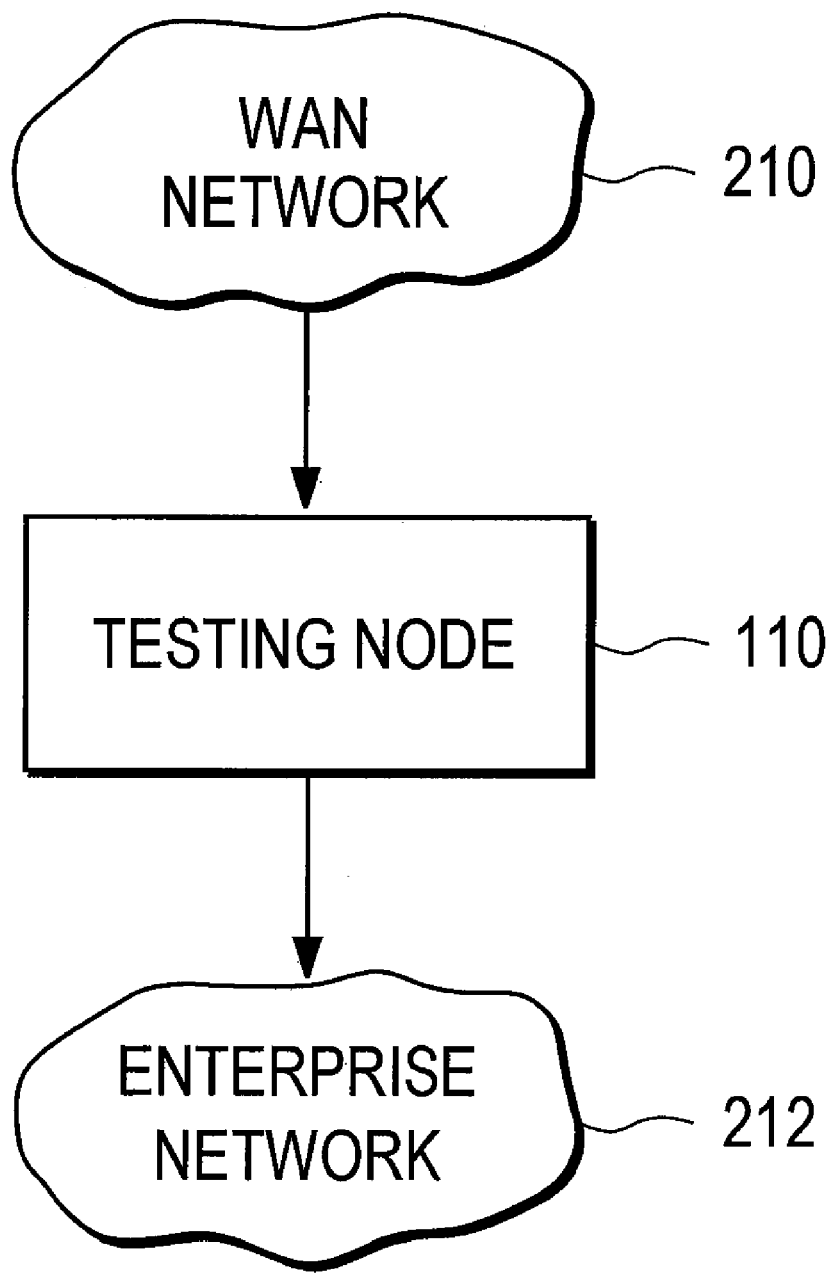
FIG. 2 is a high-level block diagram illustrating a more detailed view of the environment of a typical testing node according to one embodiment.

FIG. 2 is a high-level block diagram illustrating a more detailed view of the environment 200 of a typical testing node 110 according to one embodiment. The testing node 110 is located between a wide area network (WAN) 210 and an enterprise network 212. The WAN 210 couples a large number of computers at disparate locations and in one embodiment is the Internet (and thus is the same as network 114 of FIG. 1). The enterprise network 212 is operated by an enterprise or other entity. For example, the enterprise network 212 can be operated by a company, government agency, and/or university.

End-users at the enterprise use computers and other devices on the enterprise network 212 to exchange network traffic with computers on the WAN network 210. For example, the end-users use web browsers to download web pages from servers on the WAN network 210, exchange email messages and participate in IM sessions with other end-users of other enterprises, etc. Similarly, end-users on the WAN network 210 can direct network traffic at the enterprise network 212.

Some of the network traffic is legitimate while other traffic is malicious. Malicious traffic is generally defined as traffic that is undesirable and includes spam email (e.g., unsolicited commercial email), computer viruses, worms, and/or Trojan horse programs, network scans to detect vulnerabilities in the enterprise network, network intrusion attempts, etc. Legitimate network traffic is generally defined as traffic that one would expect to encounter in response to legitimate activities on the networks.

As shown in FIG. 2, in one embodiment the testing node 110 is located between the WAN network 210 and enterprise network 212 and thus has access to all network traffic flowing between the two networks. In some embodiments, functionality for providing the testing node 110 is integrated into one or more other network devices, such as a firewall, router, spam filter, malicious software detection tool, etc. Similarly, in some embodiments, the testing node 110 is a discrete device and is coupled to the network in a way that allows it to observe the traffic passing through it (e.g., coupled to a span port or tap of a router).

In other embodiments, the testing node 110 is located at other locations on the network, such as a location within the WAN 210, between two enterprise networks, and/or within the enterprise network. Likewise, a testing node 110 can be located at a logical location such as at a mailbox that receives emails from the Internet. In addition, a testing node 110 can be located to receive network traffic directed to a set of managed devices on the WAN 210 or enterprise 212 network, and/or on the managed devices.

In some embodiments, the testing node 110 comprises a module executing on a computer. This module can be part of a software package providing additional functionality. In one embodiment, the testing node 110 is provided by a security software vendor as part of a suite of network security services.

Figure 3:
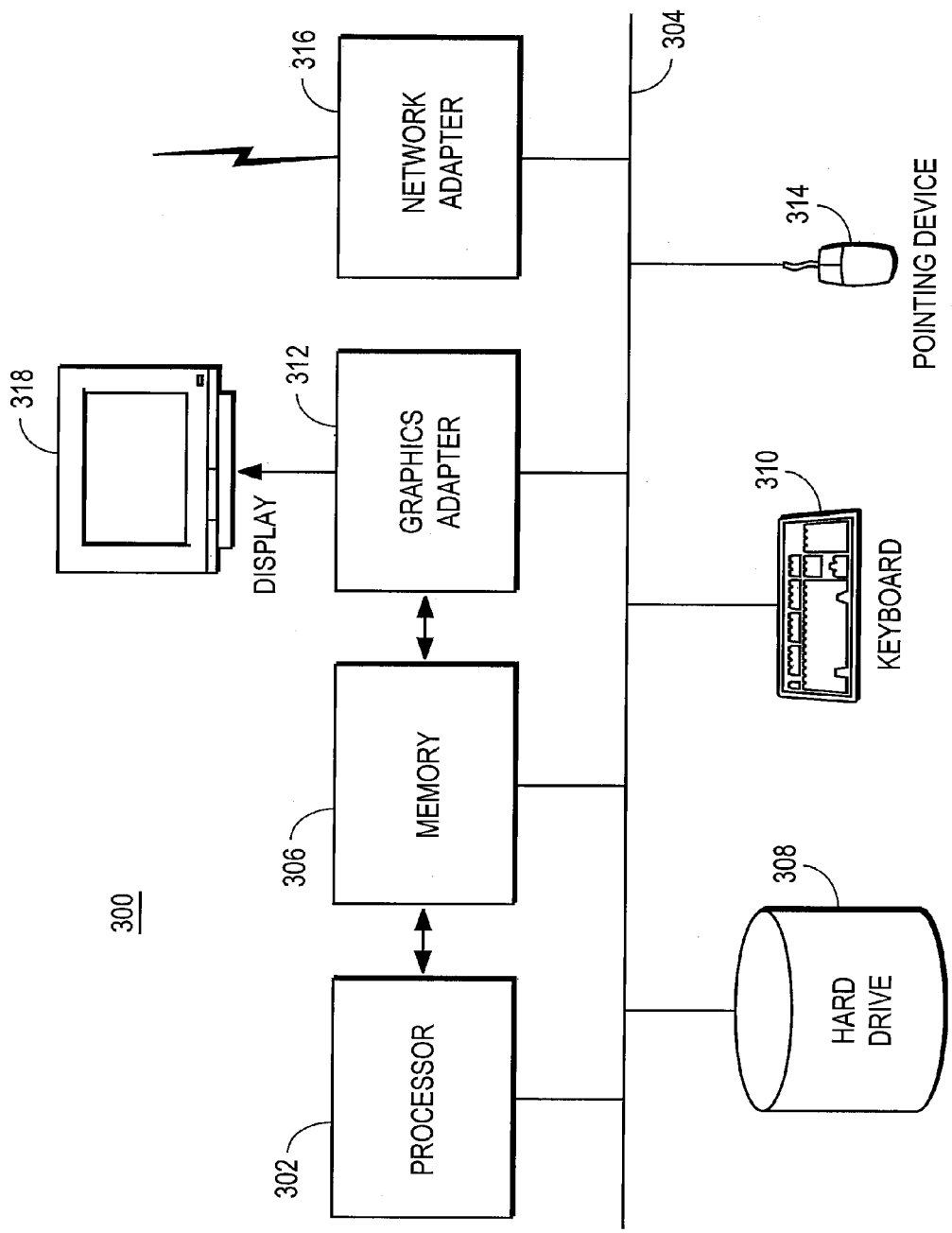
FIG. 3 is a high-level block diagram showing a computer on which a testing node and/or control point can execute according to one embodiment.

FIG. 3 is a high-level block diagram showing a computer 300 on which a testing node 110 and/or control point 112 can execute according to one embodiment. The computer 300 can be a specific function device, such as a firewall and/or router, or a general purpose device such as a personal computer or blade server. Illustrated are at least one processor 302 coupled to a bus 304. Also coupled to the bus 304 is a non-transitory computer-readable medium, such as a memory 306, a storage device 308 (which represents both fixed and/or removable storage accessible to the computer), a keyboard 310, a graphics adapter 312, a pointing device 314, and a network adapter 316. A display 318 is coupled to the graphics adapter 312. Computers acting in different roles may have different and/or additional elements than the ones shown in FIG. 3. For example, a computer 300 acting as a firewall may lack a keyboard 310, pointing device 314, graphics adapter 312 and/or display 318 because such devices are not required to operate the firewall.

As is known in the art, the computer 300 is adapted to execute computer program modules. As used herein, the term "module" refers to computer program logic for providing the specified functionality. A module can be implemented in hardware, firmware, and/or software. A module is typically stored on a computer-readable storage medium such as the storage device 308, loaded into the memory 306, and executed by the processor 302.

Figure 4:
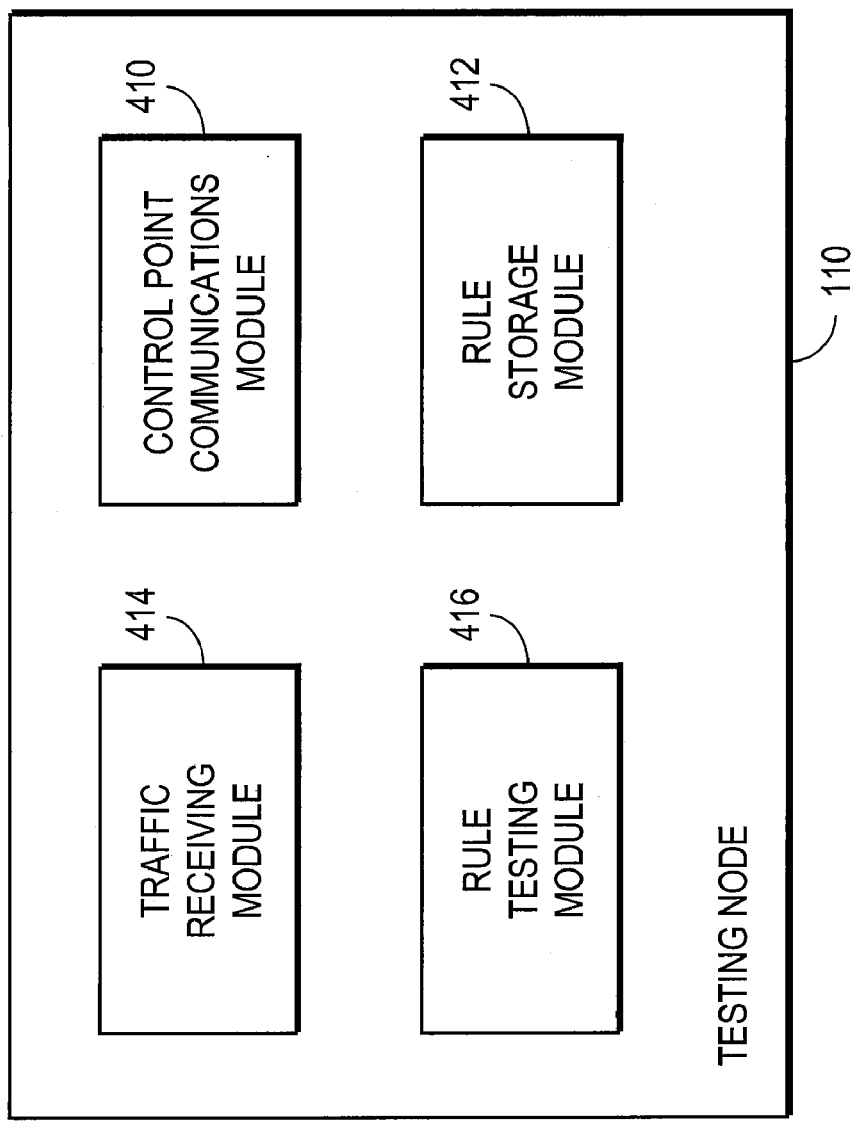
FIG. 4 is a high-level block diagram illustrating functional modules within a testing node according to one embodiment.

FIG. 4 is a high-level block diagram illustrating functional modules within a testing node 110 according to one embodiment. Other embodiments have additional and/or different modules than the ones shown in the figure. In addition, the functionalities can be distributed among the modules in a manner different than described here.

A control point communications module 410 communicates with the control point 112 via the network 114. The control point communications module 410 receives a rule set containing one or more filtering rules to be tested against the network traffic. In addition, the control point communications module 410 receives a set of test parameters that describe how the rule set is to be tested. The control point communications module 410 also provides the results of the rule testing to the control point 112. These results include, for example, statistical data describing the rules' firing characteristics, information describing the CPU utilization required to process the rules, and related information.

A rule storage module 412 stores the filtering rules and test parameters received by the control point communications module 410. The rule storage module 412 can store one or more rule sets, including rule sets that are being tested and rule sets that are actively being used to filter network traffic. In one embodiment, the rules are formed of signatures (e.g., sequences of values) and/or regular expressions (regex) describing ways to detect malicious traffic. In addition, the rules may include scripts and/or other control logic for detecting malicious traffic. For example, the rules can include: anti-spam rules and signatures, anti-virus rules and signatures, firewall rules, and intrusion signatures. An anti-virus signature can include a sequence of values that are known to occur in a particular virus. The presence of the signature in the network traffic indicates that the virus is likely to be present. An anti-spam rule can include certain words or phrases that are likely to occur in spam emails and/or additional logic for detecting whether an email message is spam (e.g., logic for detecting whether a message is sent to multiple recipients).

The test parameters describe information including when to test or suspend the rules, what data to report back to the control point 112, and/or when to report data to the control point 112. Thus, the test parameters can specify that particular rules should be tested at only certain times (e.g., 8:00 AM) and for a certain time interval (e.g., 2 hours). In addition, the parameters can specify that the rules should be suspended if they fire frequently or utilize more than a specified amount of CPU resources. Possible data that the testing node 110 can report back to the control point 112 include statistics indicating the frequency that a rule fires, a description of the CPU utilization required to process the rule, a description of the traffic that caused the rule to fire, etc. The test parameters can specify that the data are to be reported back in real-time, that aggregate data are to be reported at a given time, and/or that data are to be reported back given the occurrence of an event (e.g., the rule firing multiple times). Test parameters are associated with individual rules and/or groups of rules.

A traffic receiving module 414 receives the network traffic against which the filtering rules are tested. As described above, the traffic can be received in real-time as it passes between the WAN network 210 and the enterprise network 212. In addition, the network traffic can be buffered (e.g., recorded) and provided to the traffic receiving module 414 in a delayed and/or offline manner. Likewise, particular corpora can be generated to test different aspects of the rules (e.g., a legitimate email corpus, a spam corpus, a malicious software corpus, a legitimate HTTP traffic corpus) and can be selectively provided to the traffic receiving module 314 by a person associated with the testing node 110.

A rule testing module 416 tests the filtering rules in the rule storage module 412 against the network traffic received by the traffic receiving module 414 according to the test parameters. The specific functionality within the rule testing module 416 depends upon the types of rules and/or network traffic. In some embodiments, the rule testing module 416 includes pattern matching functionality for comparing signatures with network traffic. In some embodiments, the rule testing module 416 includes a regex engine for applying the regex rules to the network traffic. The regex engine utilizes non-deterministic finite automata (NFA) to execute the rules against the traffic.

In one embodiment, the rule testing module 416 operates in a "sandbox mode" where it applies the test rules as if it were actually filtering the network traffic, yet does not actually filter the traffic. The sandbox mode embodiment is useful when the testing node 110 is integrated into, or otherwise associated with, a network device that is actually filtering the network traffic according to a set of active rules. In some embodiments, the rules can be added or removed from the test and active sets in real time in response to instructions from the control point 112, allowing the testing node 110 to engage in flexible and transparent operation of both testing and active filtering modes.

Figure 5:
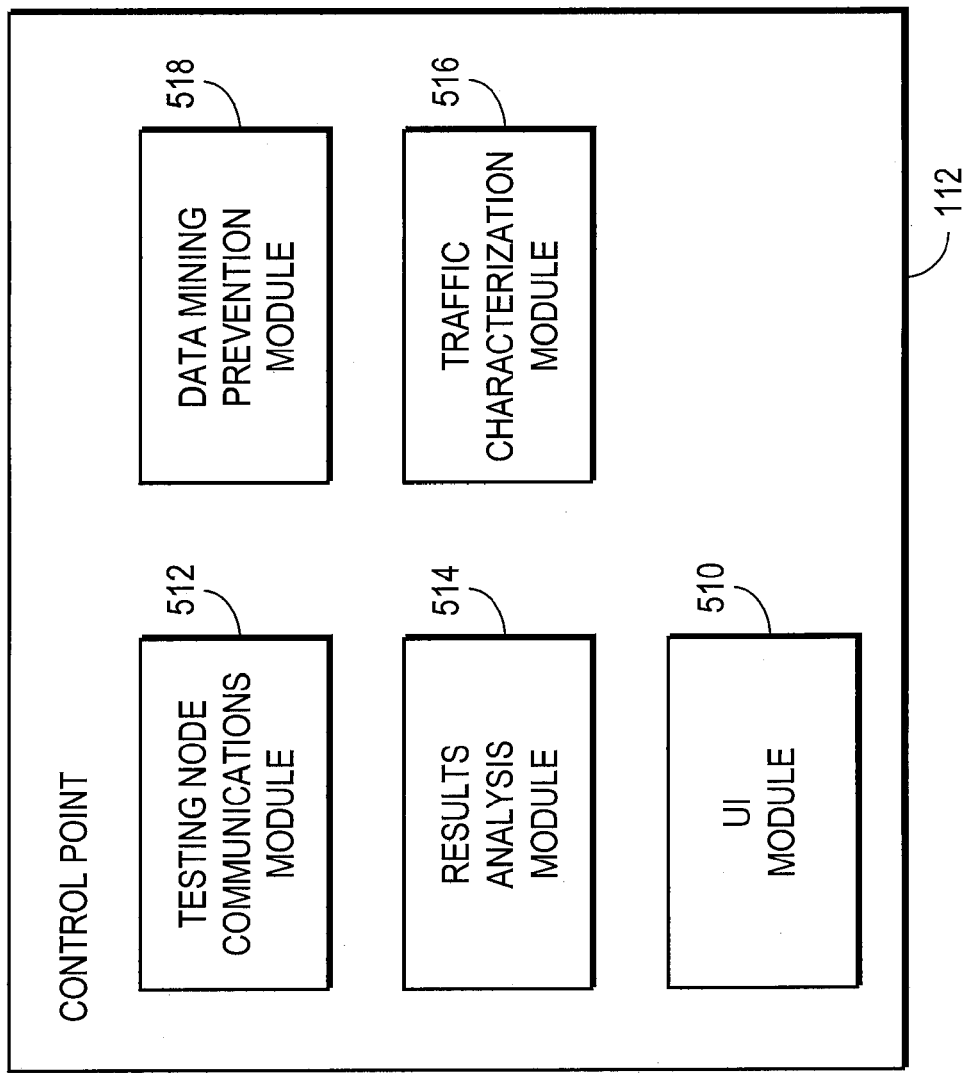
FIG. 5 is a high-level block diagram illustrating functional modules within a control point according to one embodiment.

FIG. 5 is a high-level block diagram illustrating functional modules within a control point 112 according to one embodiment. Other embodiments have additional and/or different modules than the ones shown in the figure. In addition, the functionalities can be distributed among the modules in a manner different than described here.

A user interface (UI) module 510 provides an interface allowing end-users to access the functionality of the distributed testing platform 100. In one embodiment, the interface allows end-users to submit rules for testing, define the test parameters associated with the rules, and view the results of the testing. In one embodiment, the interface is web-based and end-users use web browsers to access the functionality provided by the interface. Other embodiments use different UI technologies.

A testing node communications module 512 communicates with the testing nodes 110. These communications include providing test rules and test parameters to the testing nodes 110, receiving the test results in response, and/or instructing the testing nodes to switch rules between sandbox and active modes. In one embodiment, the testing node communications module 512 provides the test rules to all of the testing nodes 110 and in other embodiments the module provides certain rules to certain subsets of the testing nodes. For example, in some embodiments, the testing node communications module 512 provides anti-spam rules to only testing nodes 110 that receive emails. The testing nodes 110 that receive the rules are determined in response to user input from the UI module 510 and/or in response to other criteria.

A results analysis module 514 analyzes results of rule tests received from the testing nodes 110 via the testing node communications module 512. In general, the results analysis module 514 analyzes the results in view of the test parameters in order to assess the accuracy and performance of the rules. The accuracy of a rule is measured by whether the rule minimizes both false positives and false negatives. In one embodiment, the testing parameters specify an expected firing rate for the rule and the accuracy is calculated by comparing the true firing rate with the expected firing rate. For example, if an anti-virus signature is expected to detect only a virus that is not yet in the wild, one would expect that it would never fire during testing because the virus should not be encountered in network traffic. Any firings of the rule are denoted as potential false positive virus detections. Likewise, if a rule that detects spam emails is used to filter a corpus known to contain only legitimate emails, any firings of the rule are known to be false positives.

In one embodiment, the performance of a rule is measured by the CPU utilization required to execute the rule. Rules that utilize excessive CPU resources are undesirable. Performance is sometimes an issue for rules tested on a regex engine using NFAs. Evaluating regex rules against random input strings is unpredictable and certain strings can utilize an undesirably large percentage of CPU time. For example, a NFA that checks for the string "re:" in a "Subject" field of a message might encounter a malicious email that contains an extremely long string of repeating "re:" strings and utilize a significant amount of CPU time. Similarly, malicious traffic can contain malformed data that causes rules using anti-virus signatures to utilize a large amount of CPU resources.

In addition, an embodiment of the results analysis module 514 allows an end-user to inspect the network traffic that caused a rule to fire. For example, the results analysis module 514 can recreate an SMTP conversation that caused a firewall or intrusion rule to fire. Likewise, the results analysis module 514 can provide a copy of a legitimate email that caused a spam-detection rule to fire. The end-user can use the results produced by the results analysis module 514 to verify the operation of the rule and improve rules that are not optimal.

In some embodiments, the control point 112 includes a traffic characterization module 516 for characterizing the network traffic received by one or more of the testing nodes 110. Sometimes, it is desirable to use the rules to characterize traffic passing through the network 114 at the locations of the testing nodes. The characterizations can be general or specific. For example, a general characterization can indicate that the traffic contains more or less malicious traffic than average, that the traffic is recent or old, or that the email traffic contains a certain percentage of spam. A specific characterization, in contrast, can determine the frequency that a particular virus or other type of malicious traffic occurs.

In some embodiments, the control point 112 includes a data mining prevention module 518 for preventing malicious users from improperly using the distributed testing platform 100 to obtain data about network traffic received by the testing nodes 110. Since access to the distributed testing platform 100 is at least partially open in one embodiment, malicious users at one enterprise could design and test rules that provide information about network traffic received by a testing node 110 at another enterprise. The data mining prevention module 518 receives results from the testing node communications module 512 and "scrubs" the results to remove and/or obfuscate data that could potentially be misused. In one embodiment, an administrator of the distributed testing platform 100 uses the UI provided by the UI module 510 to define and control the types of data that are scrubbed.

Figure 6:
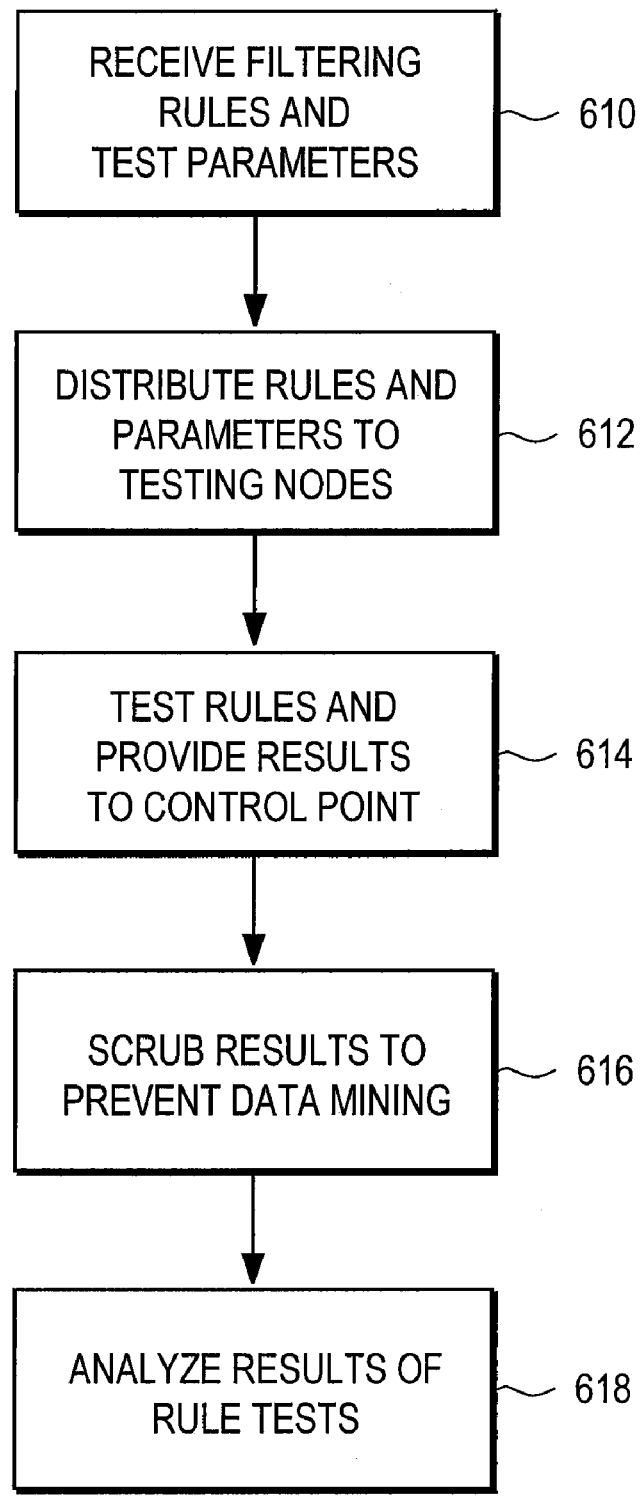
FIG. 6 is a flow chart illustrating steps performed by the distributed testing platform according to one embodiment.

FIG. 6 is a flow chart illustrating steps performed by the distributed testing platform 100 according to one embodiment. Other embodiments perform the steps in different orders and/or perform different or additional steps than the ones shown in FIG. 6.

Initially, the platform 100 receives 610 one or more filtering rules to be tested. In addition, the platform 100 receives test parameters describing how to test the rules. The rules and parameters can be received, for example, from an end-user that operates one of the testing nodes 110 or from an end-user that operates the control point 112. The control point 112 distributes 612 the rules and test parameters to one or more of the testing nodes 110 via the network 114. In turn, the testing nodes test the filtering rules against network traffic received by the testing nodes 110 according to the test parameters. The network traffic can be, for example, real-time network flows and/or stored corpora of particular types of traffic (e.g., legitimate emails). The nodes 110 provide the test results to the control point 112.

In some embodiments, the control point 112 scrubs 616 the test results to remove and/or obfuscate data that could potentially be misused. In addition, the control point 112 analyzes the results of the tests on the rules and provides the analysis to the end-user that supplied the rules. The end-user can modify and re-test the rules if necessary or desired in order to optimize the rules.

The distributed testing platform 100 thus tests the rules against a wide variety of network traffic and may quickly identify failure conditions or other problems with the rules that are not apparent with less thorough testing. Accordingly, the distributed testing network allows an end-user to quickly develop effective filtering rules.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A distributed testing platform for testing network traffic filtering rules, comprising:
  a plurality of testing node devices adapted to execute a plurality of testing nodes for receiving network traffic, for receiving a filtering rule for filtering network traffic and test parameters describing how to test the filtering rule, for testing the filtering rule on the received network traffic according to the test parameters, and for generating test results describing results of the test;

a control point computer adapted to execute a control point for receiving the filtering rule to be tested and the test parameters describing how to test the filtering rule, the test parameters including an expected firing rate of the filtering rule, for providing the filtering rule and the test parameters to the plurality of testing nodes, and for receiving the test results from the testing nodes, the test results including a true firing rate of the filtering rule; and a results analysis module adapted to execute on the control point computer for analyzing the test results to determine an accuracy of the tested filtering rule, the analysis comprising a comparison of the expected firing rate to the true firing rate.

2. The testing platform of claim 1, wherein a testing node comprises:

a rule storage module for storing a plurality of rules, wherein at least one rule in the stored plurality is designated as a test rule and at least one rule in the stored plurality is designated as an active rule, and wherein the testing node is adapted to execute the test rule in a sandbox mode where it does not filter network traffic and to execute the active rule in an active mode where it does filter network traffic.

3. The testing platform of claim 1, wherein a testing node comprises:

a rule storage module for storing rules received from the control point; and a rule testing module for testing selected rules in the rule storage module with received network traffic.

4. The testing platform of claim 1, wherein a filtering rule received by a testing node comprises a regular expression and wherein a testing node comprises:

a rule testing module having a regular expression engine for using a non-deterministic finite automaton to filter the received network traffic using the regular expression in the filtering rule.

5. The testing platform of claim 1, wherein the test results comprise one or more elements selected from the set consisting of:

an indication of a frequency that the filtering rule fires;

a description of computer processor utilization required to process the filtering rule; and a description of network traffic on which the filtering rule is tested.

6. The testing platform of claim 1, wherein the network traffic received by a testing node comprises a corpus of traffic having characteristics designed for testing filtering rules.

7. The testing platform of claim 1, wherein the expected firing rate is zero firings.

8. A method of developing a network traffic filtering rule comprising:

using a computer to perform steps comprising:

receiving a filtering rule and test parameters describing how to test the rule, wherein the test parameters include an expected firing rate of the filtering rule;

distributing the filtering rule and the test parameters to a plurality of testing nodes, the plurality of testing nodes coupled to a network at a plurality of locations disposed to encounter a variety of different network traffic;

receiving test results from the plurality of testing nodes, the test results including a true firing rate of the filtering rule; and analyzing the test results to determine an accuracy of the filtering rule, the analysis comprising a comparison of the expected firing rate to the true firing rate.

9. The method of claim 8, wherein the analysis comprises:

determining an amount of false positive and/or false negative firings of the filtering rule using the comparison of the expected firing rate to the true firing rate.

10. The method of claim 8, wherein the analysis comprises:

determining an amount of computer processor resources utilized to execute the filtering rule.

11. The method of claim 8, further comprising:

scrubbing the test results to remove and/or obfuscate data contained therein.

12. The method of claim 8, wherein the test results comprise one or more elements selected from the set consisting of:

an indication of a frequency that the filtering rule fires;

a description of computer processor utilization required to process the filtering rule; and a description of network traffic that causes the filtering rule to fire.

13. The method of claim 8, wherein the expected firing rate is zero firings.

14. A non-transitory computer-readable medium having computer program code embodied therein for controlling a distributed platform for testing a network traffic filtering rule, the computer program code comprising:

an interface module for receiving a filtering rule and test parameters describing how to test the filtering rule, wherein the test parameters include an expected firing rate of the filtering rule;

a testing node communications module for distributing the filtering rule and the test parameters to a plurality of testing nodes and for receiving test results from the plurality of testing nodes, the test results including a true firing rate of the filtering rule; and a results analysis module for analyzing the test results to determine an accuracy of the filtering rule, the analysis comprising a comparison of the expected firing rate to the true firing rate.

15. The non-transitory computer-readable medium of claim 14, wherein the results analysis module determines the accuracy of the filtering rule responsive to an amount of false positive and/or false negative firings of the rule using the comparison of the expected firing rate to the true firing rate.

16. The non-transitory computer-readable medium of claim 14, wherein the analysis comprises a determination of an amount of computer processor resources utilized to execute the filtering rule.

17. The non-transitory computer-readable medium of claim 14, the computer program code further comprising:

a data mining prevention module for scrubbing the test results to remove and/or obfuscate data contained therein.

18. The non-transitory computer-readable medium of claim 14, wherein the testing node communications module is adapted to distribute the filtering rule to a plurality of testing nodes coupled to a network at a plurality of different locations disposed to encounter a variety of different network traffic.

19. The non-transitory computer-readable medium of claim 14, wherein the test parameters comprise one or more of:

information describing when to test and/or suspend testing of the filtering rule;

information describing data to report as test results; and information describing when to report the test results.

20. The non-transitory computer-readable medium of claim 14, wherein the expected firing rate is zero firings.

\* \* \* \* \*